(12) United States Patent
Suzuki et al.

(10) Patent No.: US 7,088,661 B2
(45) Date of Patent: Aug. 8, 2006

(54) DISK MEDIUM, INFORMATION RECORDING DEVICE AND INFORMATION REPRODUCING DEVICE

(75) Inventors: Yoshihisa Suzuki, Itinomiya (JP); Sayoko Tanaka, Gifu (JP); Hiroaki Izumi, Hirakata (JP); Sinji Kobayashi, Gifu (JP)

(73) Assignee: Sanyo Electric Corp., Ltd., Moriguchi (JP)

( * ) Notice: Subject to any disclaimer, the term of this patent is extended or adjusted under 35 U.S.C. 154(b) by 439 days.

(21) Appl. No.: 10/193,181

(22) Filed: Jul. 12, 2002

(65) Prior Publication Data

US 2003/0021205 A1    Jan. 30, 2003

(30) Foreign Application Priority Data

Jul. 25, 2001 (JP) ............................. 2001-225134

(51) Int. Cl.
*G11B 7/00* (2006.01)
(52) U.S. Cl. .................. 369/53.21; 369/369; 369/47.21
(58) Field of Classification Search ............ 569/47.12, 569/47.21, 47.22, 47.27, 53.21
See application file for complete search history.

(56) References Cited

U.S. PATENT DOCUMENTS 6,760,290 B1 * 7/2004 Iida et al. ................ 369/53.21

FOREIGN PATENT DOCUMENTS

| JP | 08-147767 | | 6/1996 |
|----|-----------|---|--------|
| JP | 2001023351 A | * | 1/2001 |
| WO | WO 200104894 A1 | * | 1/2001 |
| WO | WO 01/41139 A1 | | 6/2001 |

OTHER PUBLICATIONS

JP 2001023351 English translation*
Patent Abstracts of Japan, 07-169135, Jul. 4, 1995; Ricoh Co Ltd, English Abstract (2 pages).
Patent Abstracts of Japan, 11-261943, Sep. 24, 1999; Matsushita Electric Ind Co Ltd, English Abstract (2 pages).
Patent Abstracts of Japan, 2000-040297, Feb. 8, 2000; Sony Corp, English Abstract (2 pages).
Patent Abstracts of Japan, 09-246981, Sep. 19, 1997; Sanyo Electric Co Ltd, English Abstract (2 pages).

(Continued)

*Primary Examiner*—Wayne Young
*Assistant Examiner*—Jorge L. Ortiz Criado
(74) *Attorney, Agent, or Firm*—Armstrong, Kratz, Quintos, Hanson & Brooks, LLP

(57) ABSTRACT

A disk medium, an information recording device, and an information reproducing device are provided, which are capable of efficiently recording sub-information such as security data and, if the sub-information is set as the security information, enhancing a security performance. The disk is divided into a plurality of zones in radial directions. A logical zone count in each zone is obtained by dividing a total recordable frame count in each zone by a frame count in a unit logical zone. For example, a logical zone count $N1z$ in a zone i is given by:

$$N1z = Fzi/F1z$$

where $Fzi$ is the total frame count in the zone i, and $F1z$ is a frame count in the logical zone. However, a value given by the formula (1) is not always an integer depending on the zone, and there might exist a frame (gap region) not used for the logical zone. Accordingly, the security data are recorded in this gap region.

9 Claims, 6 Drawing Sheets

OTHER PUBLICATIONS

Patent Abstracts of Japan, 11-219571, Aug. 10, 1990; Mitsubishi Electric Corp, English Abstract (2 pages).

Patent Abstracts of Japan, 10-327130, Dec. 8, 1998; Nippon Signal Co Ltd, English Abstract (2 pages).

* cited by examiner

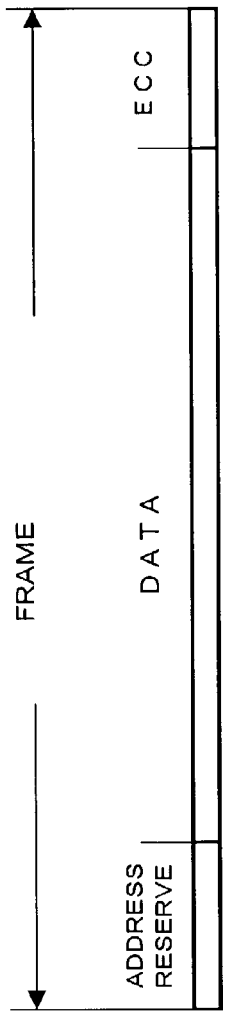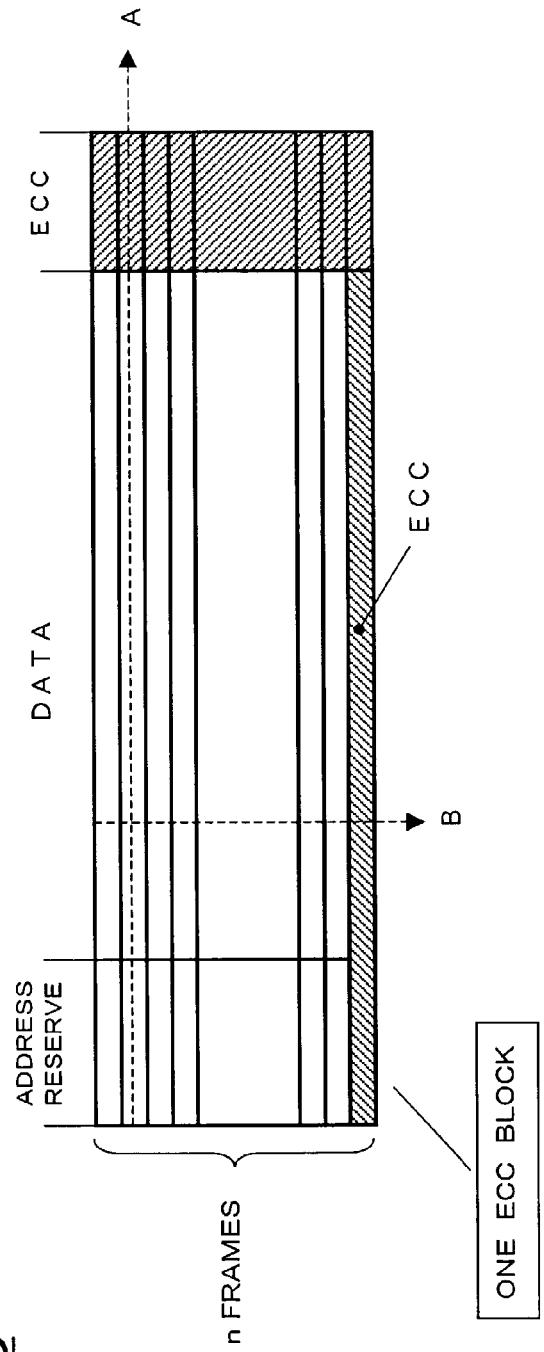
Fig. 4
Fig. 5

| CODE | FIRST SECURITY DATA | SECOND SECURITY DATA |
|---|---|---|
| 00 | NRZI plus | NRZI plus |
| 01 | NRZI plus | Biphase |
| 10 | Biphase | NRZI plus |
| 11 | Biphase | Biphase |

DISK MEDIUM, INFORMATION RECORDING DEVICE AND INFORMATION REPRODUCING DEVICE

BACKGROUND OF THE INVENTION

1. Field of the Invention

The present invention relates generally to a disk medium, an information recording device and an information reproducing device, and more particularly to a disk medium, an information recording device and an information reproducing device which are capable of efficiently recording and reproducing security information, etc.

2. Description of the Related Art

There have hitherto been proposed a variety of methods of recording sub-information such as security information on a disk.

For example, according to the invention disclosed in JP 8-147767 A, a track for security data is separately provided in a track pitch region between spiral tracks for main information, and the security data are recorded on this security track.

According to this prior art, the security data are recorded in a region separate from that for the main data, and hence, even if the data are reproduced from the main data recording track and copied to other disks, the security data are safeguarded against simultaneous copying. The security performance can be enhanced as compared with a case where the security data are simply embedded in the track for the main data.

According to the prior art described above, however, there arises a problem in that a recording density of the main data on the disk decreases. Namely, when the track for the security data is provided between the tracks for the main data, it is required that a fixed gap be ensured between the tracks for the main data, and therefore the track pitch of the tracks for the main data can not be reduced. Hence, even when trying to increase the recording density of the main data, there is a limit.

SUMMARY OF THE INVENTION

It is a primary object of the present invention to provide a disk medium, an information recording device and an information reproducing device that are capable of efficiently recording sub-information such as security data and, in the case where the sub-information is set as the security information, the security performance is enhanced.

According to the present invention, the sub-information such as the security data, are recorded in a gap between a physical format and a logical format. This enables the sub-information such as the security data to be effectively recorded without decreasing a recording capacity of the medium.

Further, modulation methods for the security data are not uniform, and one modulation method is set out of a variety of modulation methods. The security data are modulated by this set modulation method and recorded on the medium. In this way, the modulation method for the security information can be arbitrarily set, whereby the security information becomes difficult to decode, and the security performance of the medium can be enhanced.

According to an aspect of the present invention, there is provided a disk medium for recording main information by allocating a logical format onto a physical format of the disc medium, wherein at least security information and modulation method identifying information for specifying a modulation method for the security information, are recorded in a remaining region on said physical format onto which said logical format has been allocated.

According to another aspect of the present invention, there is provided an information recording device recording main information by allocating a logical format onto a physical format of the disc medium, wherein at least security information and modulation method identifying information for specifying a modulation method for the security information, are recorded in a remaining region on said physical format onto which said logical format has been allocated.

According to yet another aspect of the present invention, there is provided an information recording device for recording at least main information, and security information in a region from which data is not read out during the reproduction of the main information, wherein said region is recorded with at least modulation method identifying information for specifying a modulation method for security information, together with the security information.

Methods described below may be employed for regulating the relation between the security information and the modulation method identifying information in each of the above-mentioned aspects of the invention.

In one method, a security information block is structured of plural pieces of security information and a piece of modulation method identifying information, and one modulation method is set from among plural types of modulation methods, for each piece of security information by using the modulation method identifying information.

In another method, one piece of security information is segmented into a plurality of information segments, and one modulation method from among the plural types of modulation methods is set for each of the plurality of security information segments by use of the modulation method identifying information.

The above and other objects and novel features of the present invention will become apparent more completely by contemplating the description of the embodiment that follows in conjunction with the accompanying drawings. The following embodiment is, however, one exemplification of the present invention to the end and does not limit the scope of the present invention.

BRIEF DESCRIPTION OF THE DRAWINGS

In the accompanying drawings:

FIG. 4 shows a diagram of a logical format (frame) according to the embodiment of the invention;

FIG. 5 shows a diagram of a logical format (ECC block) according to the embodiment of the invention;

FIGS. 6A and 6B show diagrams of a format of security data according to the embodiment of the invention;

DETAILED DESCRIPTION OF THE PREFERRED EMBODIMENT

An embodiment of the present invention will hereinafter be described with reference to the accompanying drawings.

Figure 1:
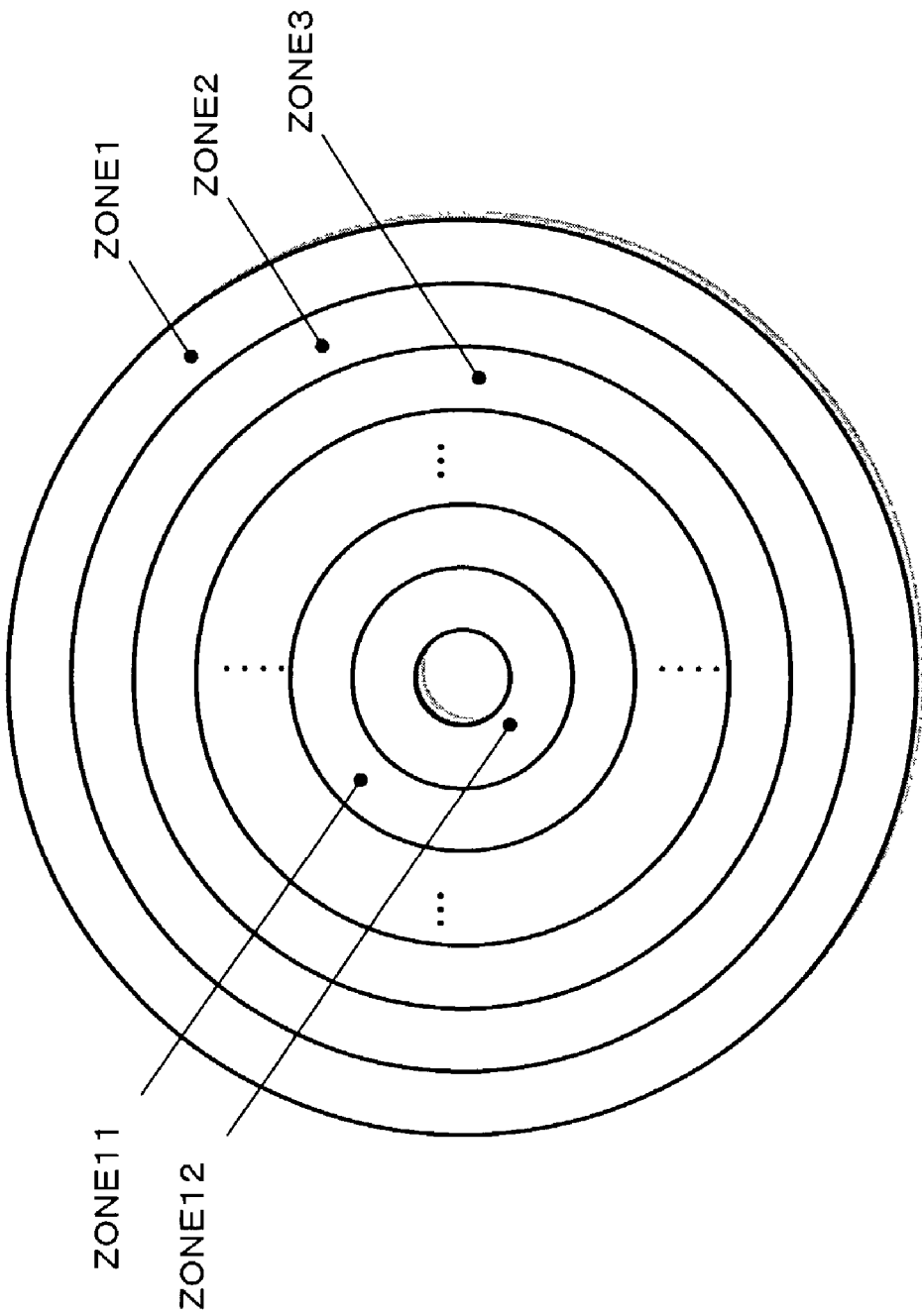
FIG. 1 shows a physical format on a magneto-optic disk according to an embodiment of the invention.

First, FIG. 1 shows a structure of a magneto-optical disk according to the embodiment of the present invention.

The disk is divided into 12 zones in radial directions. Data are recorded on and reproduced from each zone at a fixed angular speed. The angular speeds on the respective zones are different from each other. A physical format of each zone is set according to the angular speed of each zone.

Figure 2:
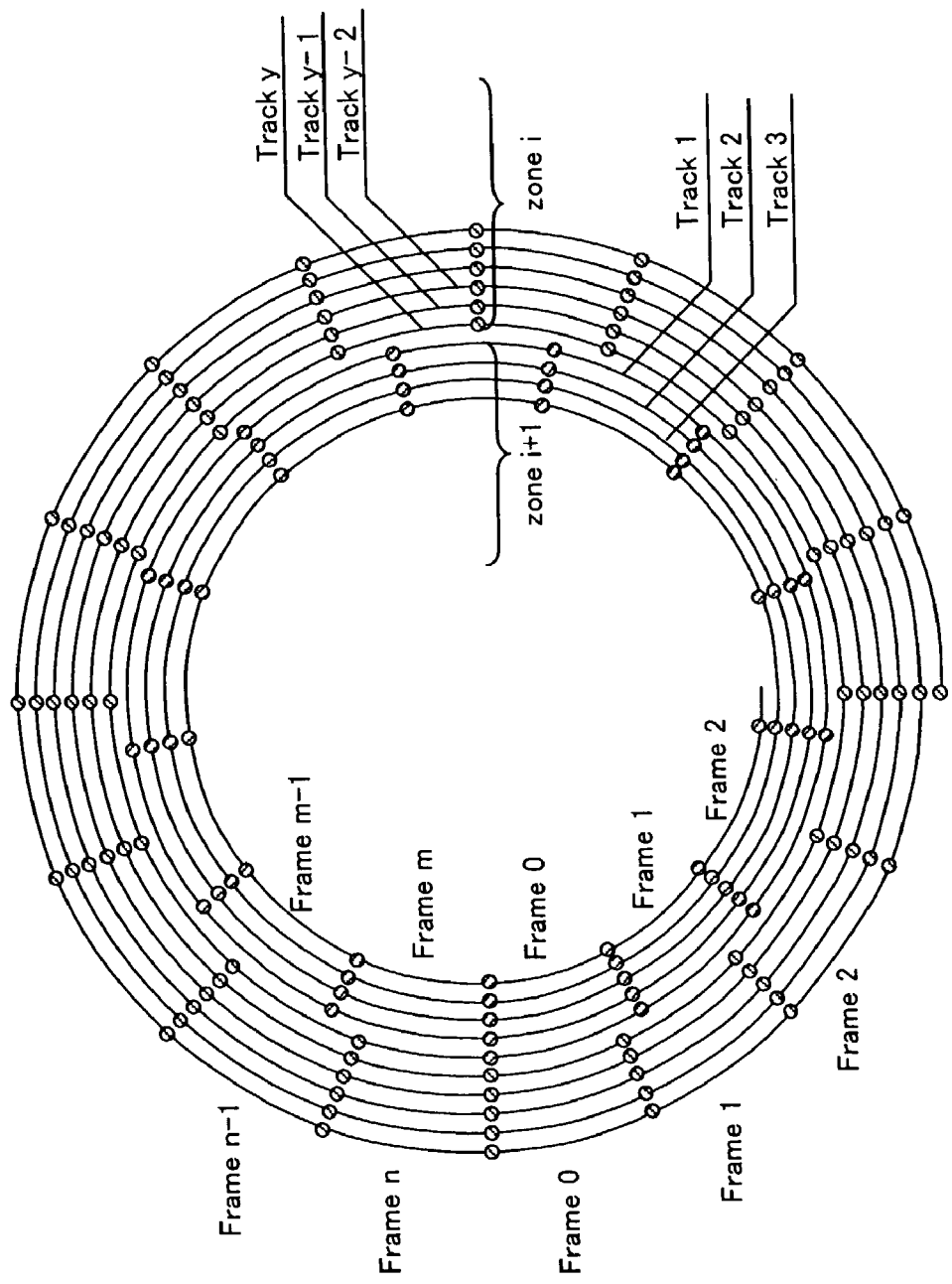
FIG. 2 shows a diagram of a physical format on the magneto-optic disk according to the embodiment of the invention.

FIG. 2 schematically shows a physical format on the disk. The disk is formed with grooves spiraling toward its inner periphery from its outer periphery. These grooves are formed as a series of grooves continuously formed throughout all the zones without discontinuity or interruption. The data are magneto-optically recorded on the groove (or both of the grooves and a land between the grooves). Note that one turn of the groove or the land is illustrated as a track in FIG. 2.

A fine clock mark (FCM) is formed on the groove (alternatively the FCMs are formed on both of the grooves and the land between the grooves). The FCMs are arranged so they are aligned in the radial direction in each of the zones. When recording and reproducing the data, beams scan the FCMs, whereby pulses having a fixed period are generated on servo signals. These pulses are utilized as synchronous signals, as will be explained later on.

The FCMs are formed in the radial directions of the disk as described above; however, an alignment position thereof is different in every zone. This difference is derived from a difference in angular speed among the zones. The alignment position of the FCMs in each zone is set based on the angular speed in each zone so that the period of the pulses on the servo signals which are obtained from the respective FCMs are the same in any zone. With this arrangement, even when reproducing data from the grooves across plural zones, the pulses (synchronous signals) based on the FCMs are generated with a fixed period, thereby making it possible to record and reproduce the data continuously over the entire disk.

Note that among the FCMs in the respective zones, the predetermined FCMs are arranged in alignment with each other in one radial direction over the entire disk. Referring to FIG. 2, for example, the respective FCMs for a zone i and a zone i+1 are arranged in alignment with each other on a radius existing in a nine o'clock direction. All the FCMs in the zones 1 through 12 including the zones i and i+1 are arranged in alignment on the radius in the nine o'clock direction. Each zone starts with the FCM existing in the nine o'clock direction, then traces the number of grooves corresponding to a predetermined track count, and ends with the FCM existing in the nine o'clock direction.

Thus, the FCMs existing in the start positions of the respective zones are arranged in alignment with each other in the radial direction. This is for fabricating convenience at the time of forming the disk. Namely, this one-line arrangement of the FCMs facilitates control of a timing of changing the angular speed when switching the zone.

Figure 3:
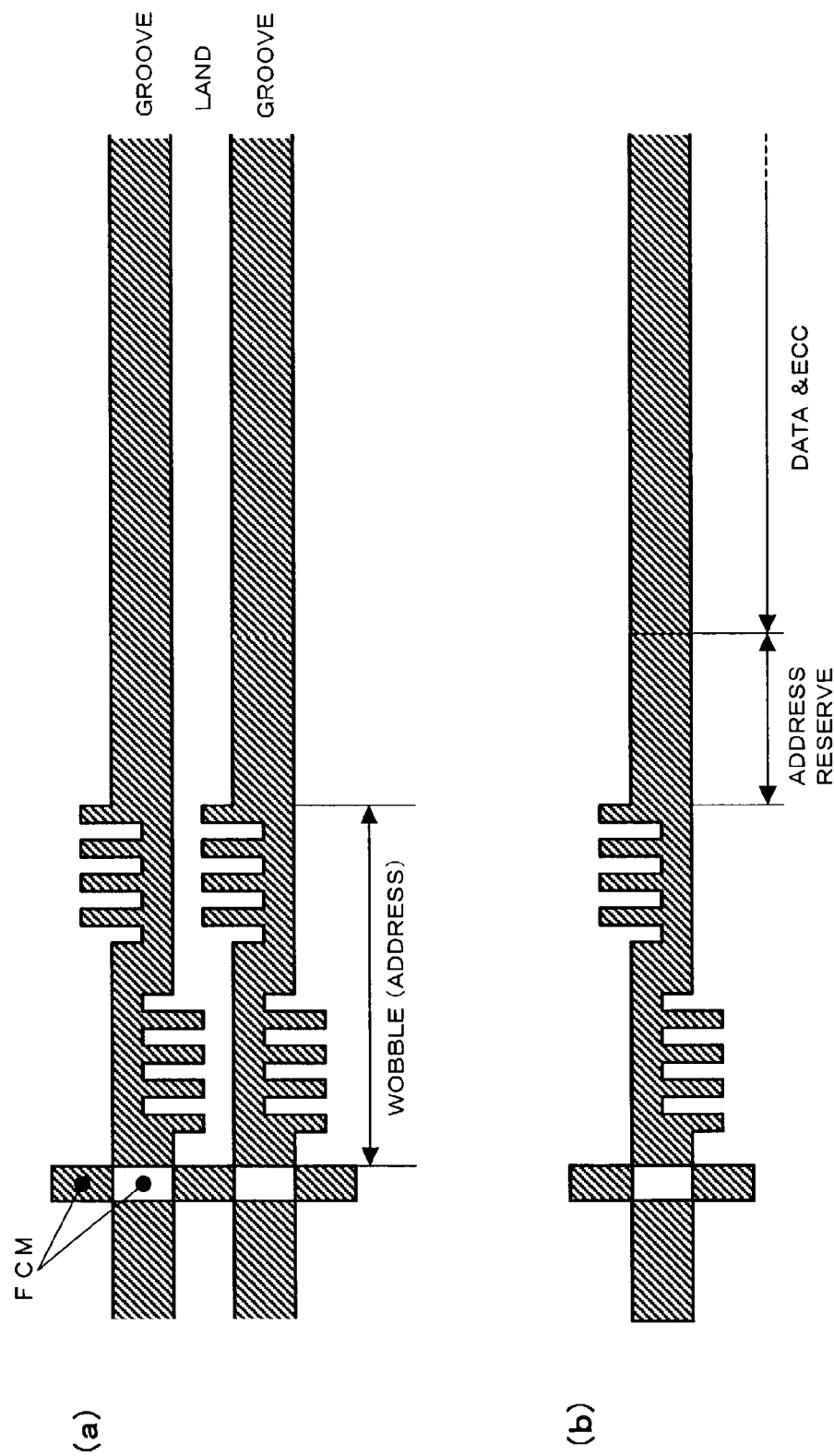
FIGS. 3A and 3B show diagrams of structures of a groove and a wobble according to the embodiment of the invention.

Further, the groove is formed with a wobble subsequent to the FCM. FIG. 3A illustrates a structure of the FCM and a structure of the wobble. The wobble is formed by twisting one wall surface of the groove in the radial direction. The thus formed wobble retains an address signal. Accordingly, the beam scans the wobble when recording and reproducing the data, whereby a signal corresponding to a wobble waveform thereof is detected from the servo signal. Address data is regenerated by demodulating this wobble signal.

The discussion will be focused next on a data format (logical format) used when recording the data on the disk physically formatted as described above.

FIG. 4 shows a data structure of one frame. The frame consists of an address reserve region, a data signal region, and an error correction code (ECC) signal region. The signals of one frame are recorded on the groove between two FCMs adjacent to each other. Referring to FIG. 3B, a region subsequent to the wobble on the groove is allocated as the address reserve region in the frame, and groove regions subsequent thereto are allocated as the data signal region and the ECC signal region. Thus, the signals for one frame are recorded on the groove in an area starting with the wobble and ending with the next FCM.

Herein, the address reserve region is used for storing a logical address on the data separately from the address retained by the wobble. Normally, this address reserve region is not stored with any address but is empty. Namely, the address reserve region is stored with zero data, and this piece of data is recorded.

Moreover, a set of n-pieces of the frames described above constitutes one single ECC block. The ECC block serves as a unit for error correction. An error contained in the in-frame signals is corrected in each frame by the error correction code (ECC) signal shown in FIG. 4. However, such an error correction has a limit in terms of its capacity, and, if more than a certain number of erroneous bits occur in the frame, the errors cannot be corrected. Such being the case, the ECC block shown in FIG. 5 is configured to enhance the error correction capacity.

Specifically, a frame storing the data for error correction is embedded in one ECC block, wherein the error in the signals vertically crosses (in the direction as indicated by an arrow B in FIG. 5) the ECC block, is corrected by this ECC frame. With this contrivance, even if error correction cannot be performed by the ECC signal in a predetermined frame (error correction conducted in a direction indicated by an arrow A in FIG. 5), several erroneous bits in the frame can be corrected through the error correction performed in the vertical direction as viewed in FIG. 5. Accordingly, it follows that most of the erroneous bits in the ECC block can be corrected by repeating the error correction a predetermined number of times in the directions A and B.

Further, a set of m-pieces of the ECC blocks constitutes a logical zone. The logical zone is defined as a unit for governing a fault in the data. Namely, the ECC blocks existing in the logical zone are categorized into data-recording ECC blocks and spare ECC blocks that are not normally utilized for recording. Then, when it is detected that a fault exists in a predetermined ECC block among the data-recording ECC blocks and that data can be thus neither recorded nor reproduced, the spare ECC block is utilized as a substitute for the fault-detected ECC block.

A predetermined number of logical zones described above exist in each zone physically-formatted on a disk. The number of the logical zones in each zone is obtained by dividing a total frame count (the number of FCMs existing in each zone) recordable in each zone, by a frame count of the unit logical zone. For example, a logical zone count $N1z$ in the zone is given by:

$$N1z = Fzi/(n \times m) \quad (1)$$

where $Fzi$ is the total frame count in the zone i.

As described above, the number of the logical zones in each zone is determined by the formula (1) given above. However, the total frame count Fzi in each zone is not fixed. Hence, there might be a case where the total frame count Fzi in the zone does not become an integer multiple of the frame count (n×m) in the unit logical zone.

In the case where the frame count in each zone and the frame count in the unit logical zone are set so that the frame count in each zone becomes an integer multiple of the frame count in the logical zone, all the frames in each zone can be utilized for recording and reproducing the data. As illustrated in FIG. 2, however, if the physical format is set so that the FCMs existing in the start position in the respective zones are arranged in alignment with the radial directions on the disk, it is difficult to set the frame count in all the zones to an integer multiple of the frame count in the logical zone. Further, the physical formatting must be performed in consideration of a variety of physical factors occurring when forming the disk and recording and reproducing the data, in addition to its relationship with the logical zone. It is therefore substantially impossible to uniformly set the frame count in all the zones to the integer multiple of the frame count in the logical zone.

Accordingly, of the zones 1 through 12, there exists a zone in which a redundant region (which may be defined as a gap between the physical format and the logical format) of the physical format which cannot be allocated to the logical zone.

Such a gap region is not allocated to the logical zone and is therefore not normally utilized for recording the main data. However, the gap region still exists as the physically-formatted region and is therefore capable of recording some category of data.

According to this embodiment, security data is recorded in this gap region. The gap region is not allocated to the logical zone and is therefore normally skipped over during the normal reproducing process. Hence, even if the data reproduced in the normal reproducing mode is copied as it is, the security data recorded in the gap region is safeguarded against such copying. Further, the gap region described above is an otherwise unnecessary region to which the logical zone is not allocated. Therefore, even if a different piece of data from the main data is recorded in this gap region, this does not affect a recording density of the main data.

Moreover, in this embodiment, an improved security data modulation method is provided in recording the security data on the gap region.

FIGS. 6A and 6B show a format of the security data. Referring first to FIG. 6A, a security data block consists of a code and two items of security data. Herein the two items of security data have the same content but are different in their modulation methods. A code modulation method is identified by the code.

Figures 6, 7:
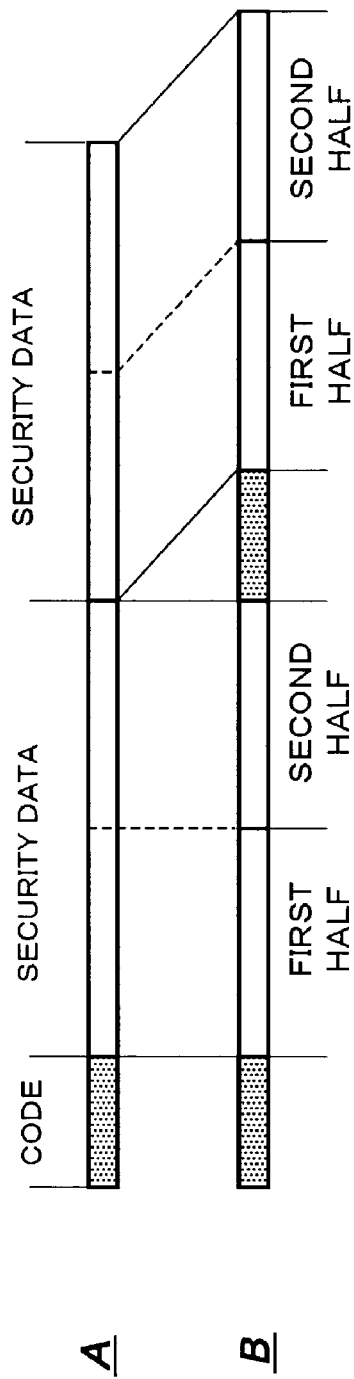
FIG. 7 shows a table for explaining a modulation method for the security data according to the embodiment of the invention.

FIG. 7 is a table showing a relationship between the code and the modulation methods for the first security data and for the second security data. The code consists of 2 bits. A high-order bit of the 2 bits indicates the modulation method for the first security data, while a low-order bit thereof indicates the modulation method for the second security data. When the bit is 0, the security data corresponding thereto is modulated by NRZIPlus (Non-Return-to-Zero-Invert-Plus). Further, when the bit is 1, the security data corresponding thereto is modulated by Biphase. Note that these modulation methods are well known, and their explanations are omitted herein.

As described above, in FIG. 6A, the two items of security data having the same content are modulated by the modulation methods specified by the codes. Herein, the recording device arbitrarily sets which modulation method is used for modulating each of the security data. For example, the codes may also be generated at random; or alternatively, an address value of the gap region may be divided by 4 and the remainder converted into a binary number of 2 bits, which may serve as a code.

When the codes are thus determined, the two items of security data are modulated according to respective bit-values of the codes. The two items of modulated security data are recorded together with the codes in the format as shown in FIG. 6A, in the gap region between the physical format and the logical format.

The security data and the codes shown in FIG. 6A are stored in the data region in the frame shown in FIG. 4 and recorded in the gap region. Herein, the security data and the codes may be stored in only a predetermined location within the in-frame data region and may also be stored repeatedly over the entire data region. Alternatively, the security data and the codes may be stored not only in one frame but in the gap regions extending over a plurality of frames or may also be stored in all the gap regions.

Determination as to which storage method is adopted among those described above may be made through comparison among a data size of the security data, a data size of other items of sub-information that should be recorded, and a capacity of the gap region. Namely, in the case where the gap region is large, when the security data and other items of sub-information are recorded a predetermined number of times repeatedly, it is easier to avoid an error in reading the data due to a dropout. Further, in the case where the data size of the sub-information other than the security data is large, the number of the frames for storing the security data needs to be made as small as possible.

Note that the two items of security data have the same content in the discussion made so far, but they may also each have a different content. Moreover, as shown in FIG. 6B, one item of security data may be divided into a first half and a second half, and the first half of the security data and the second half of the security data may be made to undergo different modulations. In this case, the high-order bit of the 2-bit code specifies the modulation method for the first half, while the low-order bit specifies the modulation method for the second half. Accordingly, it follows that one code is given to one item of security data.

Further, the 2-bit code is adopted in the above discussion, however, in the case where random modulations are to be performed for three items of security data, the code consists of 3 bits. In this case, the most significance bit (MSB) of the code specifies the modulation method for the first item of security data among the three items of security data, the second bit specifies the modulation method for the second item of security data, and the least significant bit (LSB) specifies the modulation method for the third item of security data. Further, one item of security data may be segmented into three pieces of first, second and third data segments, and the respective modulation methods for these three data segments may be specified by 3-bit code.

Similarly, the code may consist of four or more bits, and the modulation methods for four or more items of security data or for data segments of one item of security data, may be specified by the code consisting of four or more bits.

Note that the respective modulation methods are not, as a matter of course, limited to NRZIPlus and Biphase described above.

Determination of a zone in which, from among the zones 1 through 12 in FIG. 1, the security data and other items of sub-information are recorded in the gap regions is made through comparison of the capacities of the respective gap regions. If there exists a zone having the gap regions extending over one ECC block, the security data etc are recorded in this zone on each ECC block unit. This scheme enhances the error correction capacity, whereby the security data can be surely reproduced. Furthermore, the security data etc can be processed by utilizing the reproducing system for the main data as it is, which processes the data on each ECC block unit.

If the gap region is smaller than one ECC block, this single ECC block may be formed by utilizing the gap regions of a plurality of zones. For example, the frame count in the gap regions in each of the zones 1 through 3 is less than the frame count in one ECC block. However, in the case where the frame count of one ECC block can be reached by adding together the respective frame counts in these zones, the security data and other items of sub-information are recorded in division in the gap regions of these zones 1 through 3. Further, if the security data are not managed in one ECC block, the security data may be recorded in the zone having the gap regions smaller than one ECC block.

Next, a recording/reproducing device for recording and reproducing data on and from the magneto-optic disk will be explained with reference to FIG. 8.

Figure 8:
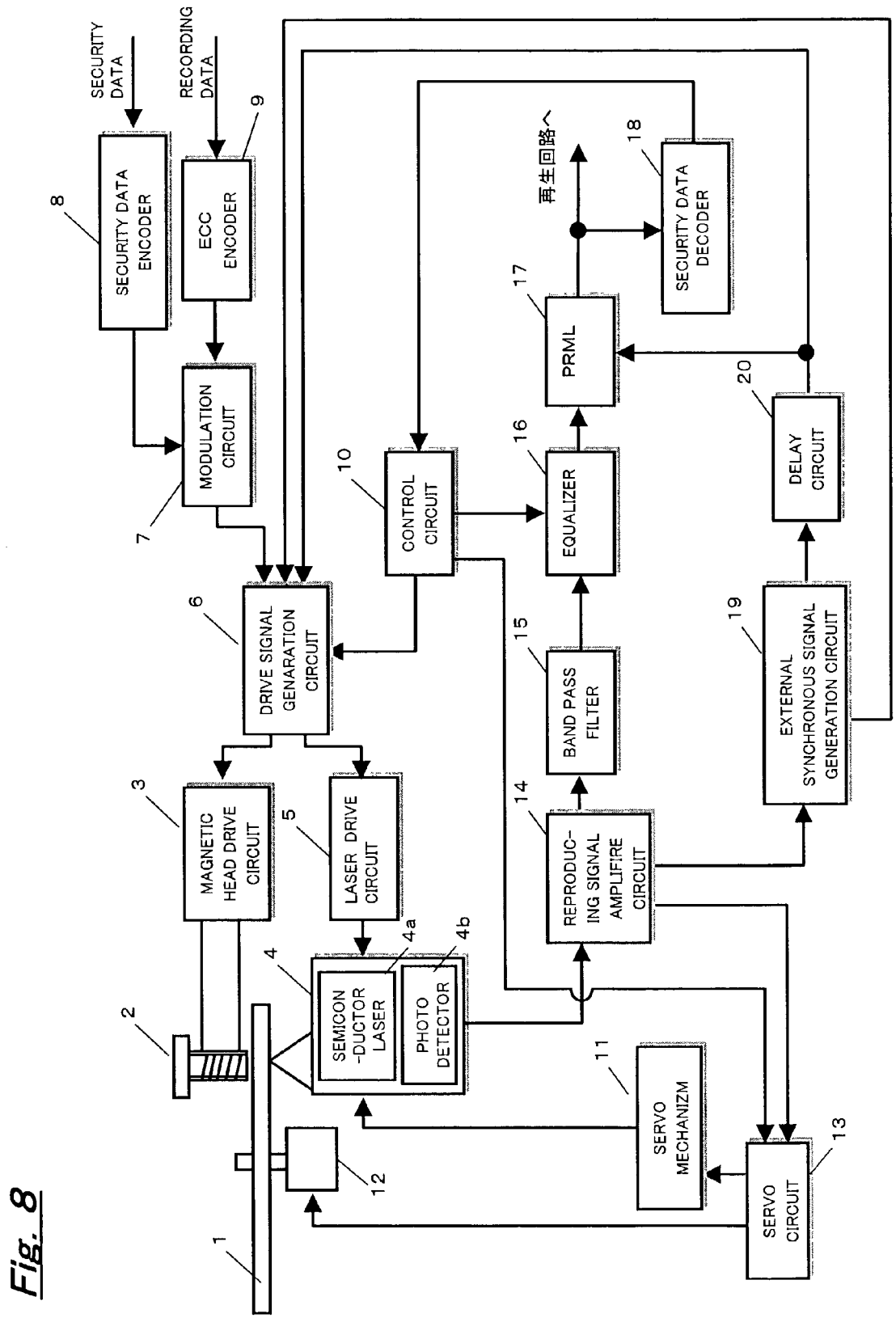
FIG. 8 shows a block diagram of a recording/reproducing device according to the embodiment of the invention.

Referring to FIG. 8, the recording/reproducing device includes a magneto-optic disk 1, a magnetic head 2 for applying a magnetic region onto the groove existing in a recording position, a magnetic head drive circuit 3 for driving the magnetic head 2, an optical head 4 for irradiating the groove on the magneto-optic disk with laser beams, and then receiving light reflected therefrom and outputting a reproducing signal, a laser drive circuit 5 for driving a semiconductor laser of the optical head 4, and a drive signal generation circuit 6.

Herein, the optical head 4 has a semiconductor laser 4a and a photo detector 4b. The semiconductor laser 4a outputs pulse beams with a clock corresponding to each record pit when recording the data. On the other hand, the magnetic head drive circuit 3 applies a magnetic region modulated according to the record signal. The signal magnetized according to the record signal is thereby magneto-optically recorded on the groove.

The recording/reproducing device further includes a modulation circuit 7 for generating a record signal (waveform signal) by effecting, e.g., an NRZI (Non-Return to Zero Invert) modulation upon the code signal, a security data encoder 8 for encoding the security data, and an ECC encoder 9 for encoding the recording data on the ECC block unit.

Herein, the security data is inputted to the security data encoder 8, then NRZIPlus- or Biphase-modulated and given the code signal as explained in FIG. 6A or 6B, and is thereafter outputted to the modulation circuit 7. Further, the data signals that should be recorded are inputted to the ECC encoder 9 and encoded so as to correct the error on each of the ECC block units shown in FIG. 5. Then, the thus encoded security data and record data are NRZI-modulated by the modulation circuit 7 and converted into the record signals.

The recording/reproducing device further includes a control circuit 10 for controlling the respective units, a servo mechanism 11 for focus-controlling and tracking-controlling the beams transmitted from the optical head 4, a spindle motor 12 for rotating the magneto-optic disk 1, and a servo circuit 13 for controlling the servo mechanism 11 and the spindle motor 12.

Herein, the servo circuit 13 drives the servo mechanism in accordance with a focus error signal and a tracking error signal that are amplified and transmitted by a reproducing signal amplifier circuit 14. Further, the servo circuit 13 controls rotation of the spindle motor 12 so as to obtain an angular speed that is preset in each zone, in accordance with a control signal given from the control circuit 10 and an FCM detection signal given from the reproducing signal amplifier circuit 14.

This reproducing signal amplifier circuit 14 amplifies an optical reproducing signal (RF signal), a magneto-optic reproducing signal, a focus error signal and a tracking error signal from the photo detector 4b. The methods of generating those signals and a configuration of the photo detector 4b have hitherto been well known, and hence their explanations are herein omitted.

Among the signals amplified by the reproducing signal amplifier circuit 14, the magneto-optic reproducing signal is outputted to a band pass filter 15, and the optical reproducing signals are outputted to an external synchronous signal generation circuit 19 and the servo circuit 13. Further, the focus error signal and the tracking error signal are outputted to the servo circuit 13.

The recording/reproducing device yet further includes the band pass filter 15 for cutting noises in the magneto-optical reproducing signals, an equalizer 16 for eliminating waveform interference occurring on the magneto-optic reproducing signals due to the recorded magnetized signals, a PRML (Partial Response Maximum Likelihood) circuit 17 for outputting a binary reproducing signal by decoding the signal from which the waveform interference has been eliminated, and a security data decoder 18 for receiving and decoding the security data signal from among the magneto-optic reproducing signals.

Herein, the security data decoder 18 detects an encoding method for the security data by the code signal among the magneto-optic reproducing signals formatted as shown in FIG. 6(a) or 6(b), and decodes the security data by this encode method. Then, if an error occurs in decoding by the security data decoder 18, for example, if the security data can not be properly detected, an error signal is outputted to the control circuit 10. Upon receiving the error signal, the control circuit 10, switches OFF the equalizer 16 and the servo circuit 13. Data reproduction from the magneto-optic disk is thus stopped. Note that an error indication may be displayed on a monitor unit of the device on this occasion. Alternatively, an error announcement may be outputted from a speaker.

The recording/reproducing device further has the external synchronous signal generation circuit 19 for detecting the FCM signal from the servo signals and generating a synchronous signal, and a delay circuit 20 for delaying the synchronous signal.

Herein, the external synchronous signal generation circuit 19 has a PLL (Phase Locked Loop) circuit and a reference clock generating circuit, and generates the synchronous signal based on the FCM signal. Further, the delay circuit 20 delays the synchronous signal so as to match it with a synchronization timing of the recording/reproducing signal.

Next, operations of the recording/reproducing device will be explained.

First, the recording operation will be described. When a recording command is given, the recording data are formatted as shown in FIGS. 4 and 5 in the ECC encoder 9 and encoded into data corresponding to an ECC operation. The thus processed recording data are NRZI-modulated by the modulation circuit 7 and inputted to the drive signal generation circuit 6. The drive signal generation circuit 6 drives the magnetic head drive circuit 3 and the laser drive circuit 5 so that the recording signals (waveform signals) from the modulation circuit 7 are magneto-optically recorded in a region within the groove which is provided subsequent to the wobble, while referencing the synchronous signals from the external synchronous generation circuit 19 and the delay circuit 20. Thus, the recording data are sequentially recorded in the predetermined zone in accordance with the logical format described above.

When the data are thus recorded and the entire logical zone provided in this zone is used up for recording, the recording position is skipped over to a start position of a next zone. The data are thus consecutively recorded in the zone concerned. On this occasion, the servo circuit 13 commands the servomechanism 11 to skip over to the next zone and commands the spindle motor 12 to switch to the angular speed in the next zone. This zone switchover is repeated until the series of recording data are all recorded.

Then, upon recording all the recording data, a recording of the security data is started next. The security data is, after being encoded by the security data encoder 8 as explained above, NRZI-modulated by the modulation circuit 7 and inputted to the drive signal generation circuit 6. On this occasion, the control circuit 10 issues a command to the servo circuit 13 to make the recording position gain access to the gap region (the region not used for the logical zone) in the zone in which the security data should be recorded.

After the recording position has thus gained access to the gap region, the drive signal generation circuit 6 drives the magnetic head drive circuit 3 and the laser drive circuit 5, thereby recording the security data signal on the groove in the gap region. Then, upon finishing the recording of the security data signal, the recording/reproducing device finishes its recording operation.

The discussion will next be focused on a reproducing operation.

When a command of reproducing a predetermined item of recorded information is given, the control circuit 10 issues a command to the servo circuit 13 to make the optical head 4 access the gap region recorded with the security information for the recorded information. In response to this command, the optical head 4 accesses the gap region and scans the groove in this region with laser beams.

Signals obtained from the photo detector 4b through the scan described above are processed in a reproducing system constructed of the reproducing signal amplifier circuit 14 through the PRML circuit 17, and inputted to the security data decoder 18. The security data decoder 18 detects the code shown in FIG. 6A or 6B from the reproducing signals, and decodes the security data in accordance with this code.

Herein, when the modulation method specified by the code matches with the modulation method for the security data, the security data is decoded, and the normal security data is reproduced. If the modulation method specified by the code does not match with the modulation method for the security data, however, the security data decoder does not reproduce the normal security data.

The security data decoder 18 outputs, to the control circuit, information regarding whether the normal security data has been reproduced. Herein, when the normal security data is reproduced, the control circuit 10 commands the servo circuit 13 to make the optical head 4 accesses the recorded information concerned in order to reproduce this item of recorded information. In response to this command, the optical head 4 reads the recorded information from the disk. The thus read-out information are processed in the reproducing system constructed of the reproducing signal amplifier circuit 14 through the PRML circuit 17, and decoded by an unillustrated ECC decoder.

On the other hand, if the normal security data is not reproduced by the security data decoder 18, the control circuit 10 halts the operations of the equalizer 16 and of the servo circuit 13, thereby stopping the subsequent reproducing operation. At the same time, the control circuit 10 gives an instruction for displaying an error message on an unillustrated display unit.

Note that the following is a method of judging whether the security data encoder 18 has reproduced the normal security data. For example, as shown in FIG. 6A, if two items of security data having the same content are modulated, a judgement of "the reproduction of the security data is OK" is made when both items of the security data are reproduced. Further, as shown in FIG. 6B, in the case where one item of security data is segmented into two data segments, and each of the data segments undergoes a predetermined modulation, the judgement of "the reproduction of the security data is OK" is made when all of the single item of security data is reproduced.

In the case of FIG. 6A, however, the judgement of "the reproduction of the security data is OK" may be made when any one item of security data is reproduced. Particularly, if one code is allocated to three or more items of security data, rather than two items of security data as in FIG. 6A, there is an increased probability of an error occurring during reproduction of the security data due to a dropout, and hence the judgement of "the reproduction of the security data is OK" may be made when a more than predetermined number of items of security data was able to be reproduced from among the three or more items of security data.

As discussed above, the security data is not reproduced and outputted when reproducing the main information in the recording/reproducing device shown in FIG. 8. Therefore, even if the reproducing signals in the reproducing operation are copied as they are, the security data can not be copied. Moreover, since the security data is modulated by a given modulation method specified by the code, it is difficult to reproduce the security data from the readout signals. Accordingly, the security data containing an important piece of data such as an encryption key etc can be protected with a greater security.

The embodiment of the present invention has been discussed so far; however, the present invention is not limited to the embodiment discussed above and can be modified in a variety of modes.

For example, according to the embodiment discussed above, the security data is recorded in the gap region in each zone, which is not utilized for the logical zone. If the address reserve region is not used for the normal data reproduction, the security data may be recorded in this address reserve region. In this case, the data capacity of the address reserve region is small, and therefore, when managing the security data of each ECC block unit, the security data may be recorded by being distributed over the address reserve regions for one ECC block. In such a case, the security data are modulated based on the arbitrary modulation methods specified by the codes as shown in FIGS. 6A and 6,for example.

Moreover, according to the embodiment discussed above, the magneto-optic disk is divided into the 12 zones, and the angular speed is varied for each zone. However, the number of divided zones is not limited to the above value, and the angular speed setting is not confined to that mentioned above. For example, the security data may be recorded in the gap region produced in the case where only one zone is provided and the logical zone is allocated therefor.

Further, the information that should be recorded in the gap region is preferably information of high confidentiality such as the security data as exemplified in the embodiment discussed above. Although, it is not confined to this category of information, and other categories of information such as the sub-information used for the normal control etc may also be recorded therein.

Moreover, the physical format and the logical format are not limited to those illustrated in the embodiment given above. For example, one ECC block may serve as the logical zone, and, if the error correction by the ECC is not performed in the ECC block, the logical zone can also be configured simply by a predetermined number of frames.

In other respects, the security data modulation method may involve the use of a variety of modulation methods in addition to NRZIPlus and Biphase. Furthermore, the recording medium may be a Write Once Read Many (WORM) disk using an organic pigment or a rewritable disk or a reproduce-only disk.

The embodiment of the present invention can be properly modified in various forms within the scope of the technical concept of the present invention.

What is claimed is:

1. A disk medium for recording main information by allocating a logical format onto a physical format of the disc medium,
   wherein at least security information and modulation method identifying information for specifying a modulation method for the security information, are recorded in a remaining region on said physical format onto which said logical format has been allocated,
   wherein said physical format is configured such that the disk medium has plural zones in a radial direction, and
   wherein said remaining region is a remaining region on each zone onto which the logical format has not been allocated.

2. The disk medium according to claim 1, wherein:
   a security information block is structured of plural pieces of security information and a piece of modulation method identifying information; and
   one modulation method from among plural types of modulation methods is set for each piece of security information by using the modulation method identifying information.

3. The disk medium according to claim 1, wherein:
   one piece of security information is segmented into a plurality of information segments; and
   one modulation method from among plural types of modulation methods is set for each of the plurality of security information segments by use of the modulation method identifying information.

4. An information recording device for recording main information by allocating a logical format onto a physical format of a disk, comprising:
   a recording head and a drive circuit for driving the recording head,
   wherein the recording head records information onto a groove in the disk and records at least security information and modulation method identifying information for specifying a modulation method for the security information onto a remaining region on said disk,
   wherein said physical format is configured such that the disk medium has plural zones in a radial direction, and
   wherein said remaining region is a remaining region on each zone onto which the logical format has not been allocated.

5. The information recording device according to claim 4, wherein:
   a security information block comprises plural pieces of security information and a piece of modulation method identifying information; and
   one modulation method from among plural types of modulation methods is selected for each piece of security information by using the modulation method identifying information.

6. The information recording device according to claim 4, wherein:
   one piece of security information comprises a plurality of information segments; and
   one modulation method from among the plural types of modulation methods is selected for each of the plurality of security information segments by use of the modulation method identifying information.

7. An information reproducing device for reproducing data from a disk medium in which main information is recorded by allocating a logical format onto a physical format and at least security information and further modulation method identifying information for specifying a modulation method for the security information are recorded in a remaining region on the physical format onto which said logical format has been allocated to record the main information, the physical format is configured such that the disk medium has plural zones in a radial direction, the remaining region is a remaining region on each zone onto which the logical format has not been allocated, comprising:
   an optical head for irradiating a groove on the disk medium with laser beams and receiving light reflected therefrom and outputting a reproducing signal;
   a laser drive circuit for driving a semiconductor laser of the optical head; and
   a drive signal generation circuit,
   wherein the security information and the modulation method identifying information are obtained by irradiating the remaining region with laser beams when reproducing data, if the security information cannot be reproduced based on the modulation method identifying information obtained, the reproduction of data from said disk medium is stopped.

8. The information reproducing device according to claim 7, wherein:
   a security information block comprises plural pieces of security information and a piece of modulation method identifying information;
   one modulation method from among plural types of modulation methods is selected for each piece of security information by using the modulation method identifying information; and
   in the case where a predetermined or larger number of pieces of security information are not reproduced from among the plural pieces of security information, reproduction of data from said recording medium is stopped.

9. The information reproducing device according to claim 7, wherein:

one piece of security information comprises a plurality of information segments;

one modulation method from among the plural types of modulation methods is selected for each of the plurality of security information segments by use of the modulation method identifying information; and in the case where the whole segmented security information is not reproduced, reproduction of data from said recording medium is stopped.

* * * * *